US006688637B2

(12) United States Patent
Igawa et al.

(10) Patent No.: US 6,688,637 B2
(45) Date of Patent: Feb. 10, 2004

(54) AIRBAG APPARATUS

(75) Inventors: Tadahiro Igawa, Tokyo (JP); Masahiro Hasebe, Tokyo (JP); Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/758,545

(22) Filed: Jan. 12, 2001

(65) Prior Publication Data
US 2001/0030412 A1 Oct. 18, 2001

Related U.S. Application Data
(60) Provisional application No. 60/176,025, filed on Jan. 14, 2000, provisional application No. 60/182,907, filed on Feb. 16, 2000, provisional application No. 60/186,745, filed on Mar. 3, 2000, provisional application No. 60/190,013, filed on Mar. 17, 2000, provisional application No. 60/207,190, filed on May 26, 2000, and provisional application No. 60/208,053, filed on May 31, 2000.

(51) Int. Cl.[7] .............................................. B60R 21/16
(52) U.S. Cl. ................ 280/728.2; 280/731; 200/61.54; 200/61.55
(58) Field of Search ............................ 280/728.2, 731, 280/743.1; 200/61.54, 61.55

(56) References Cited

U.S. PATENT DOCUMENTS

| 5,228,362 A | * | 7/1993 | Chen et al. ............... 200/61.55 |
| 5,508,481 A | * | 4/1996 | Williams et al. .......... 200/61.54 |
| 5,575,498 A | * | 11/1996 | Elqadah et al. .......... 200/61.54 |
| 5,593,178 A | * | 1/1997 | Shiga et al. ............. 200/61.55 |
| 5,627,352 A | * | 5/1997 | Suzuki et al. ............ 200/61.54 |
| 5,727,811 A | * | 3/1998 | Nagata et al. ............ 280/731 |
| 6,062,592 A | * | 5/2000 | Sakurai et al. ........... 280/728.2 |
| 6,079,737 A | * | 6/2000 | Isomura et al. .......... 200/61.54 |
| 6,086,090 A | * | 7/2000 | Fischer .................... 200/61.55 |
| 6,092,832 A | * | 7/2000 | Worrell et al. ........... 280/728.2 |
| 6,139,051 A | * | 10/2000 | Fujita ....................... 280/731 |
| 6,147,315 A | * | 11/2000 | Rudolph et al. ......... 200/61.54 |
| 6,161,863 A | * | 12/2000 | Fujita et al. ............. 280/728.2 |
| 6,196,573 B1 | * | 3/2001 | Worrell et al. .......... 280/728.2 |
| 6,199,908 B1 | * | 3/2001 | Isomura et al. ............. 280/731 |
| 6,244,618 B1 | * | 6/2001 | Yokota ..................... 200/61.55 |
| 6,257,615 B1 | * | 7/2001 | Bohn et al. .............. 200/61.54 |
| 6,299,201 B1 | * | 10/2001 | Fujita ....................... 200/61.55 |
| 6,312,012 B1 | * | 11/2001 | Bohn et al. .............. 200/61.54 |

FOREIGN PATENT DOCUMENTS

| JP | 6-53365 | | 7/1994 | |
| JP | 10-100832 | | 4/1998 | |
| JP | 10-106383 | | 4/1998 | |
| JP | 2591505 | | 12/1998 | |
| JP | 11-297155 | | 10/1999 | |
| JP | 18807 | * | 1/2001 | ............. 280/728.2 |
| JP | 58572 | * | 3/2001 | ............. 280/728.2 |
| JP | 325853 | * | 11/2001 | ............. 280/728.2 |

* cited by examiner

Primary Examiner—Paul N. Dickson
Assistant Examiner—Toan C To
(74) Attorney, Agent, or Firm—Foley & Lardner

(57) ABSTRACT

An airbag apparatus having a retainer that can be employed with various embodiments of a horn switch that is turned on by the floating movement of a module cover. The apparatus includes an opening formed on a leg section of a module cover and a hook of a retainer, a predetermined gap is formed, thereby the module cover can be vertically moved. When the module cover is pressed, a horn switch is pressed so as to be turned on. Because a horn-switch supporting member is a separated part from the retainer, the retainer can be common to various models of the airbag apparatus having the module cover different in size and shape by changing only the horn-switch supporting member.

18 Claims, 20 Drawing Sheets

AIRBAG APPARATUS

CROSS-REFERENCE TO RELATED APPLICATIONS

This application claims priority to and the benefit of the following patent applications:

U.S. Provisional Application Serial No. 60/176,025 filed Jan. 14, 2000;

U.S. Provisional Application Serial No. 60/182,907 filed Feb. 16, 2000;

U.S. Provisional Application Serial No. 60/186,745 filed Mar. 3, 2000;

U.S. Provisional Application Serial No. 60/190,013 filed Mar. 17, 2000;

U.S. Provisional Application Serial No. 60/207,190 filed May 26, 2000;

U.S. Provisional Application Serial No. 60/208,053 filed May 31, 2000;

The above listed applications are incorporated by reference herein in their entirety.

BACKGROUND

The present invention relates to an airbag apparatus having a horn switch. More specifically, it relates to an airbag apparatus configured so that a horn switch is turned on only by actuation of a module cover when the airbag is pressed.

A driver-side airbag apparatus arranged in a steering wheel may be designed to include a module cover that when pressed, activates a horn switch so as to sound a horn. When the airbag apparatus is formed such that not the entire airbag apparatus but only the module cover is to be actuated, the pushing force for turning on the horn switch can be small.

An airbag apparatus 100 having such a structure is shown in FIG. 29. The airbag apparatus 100 comprises a retainer 102, an airbag 106 attached to the retainer 102 with an airbag fitting ring 104, an inflator 108 for inflating the airbag 106, and a module cover 110 for covering the folded airbag 106.

An integral leg section 112 protrudes from the back side of the module cover 110, and hooks 116 of a side-wall section 114 which is bent forward from the retainer 102 are inserted through openings 118 in the leg section 112. Each hook 116 outwardly protrudes from the side-wall section 114 in an L-shape.

The inflator 108 includes a flange 108a. Bolts 120 protruding from the ring 104 are inserted through the retainer 102 and the flange 108a, so that the inflator 108 is fixed to the retainer 102 together with the airbag 106 by tightening nuts 122.

The shape of the folded airbag 106 is maintained by a shape holding member 124. The shape holding member 124 allows the airbag 106 to expand by breaking-off or deforming when the airbag 106 is inflated.

A bracket 132 protrudes upwardly from a steering wheel 130, and projecting pieces 134 protruding downward from the backside of the retainer 102. The pieces 134 are fixed to the bracket 132 with bolts 136 and nuts 138.

A predetermined sized gap is formed between the back face of the module cover 110 and the shape holding member 124. A predetermined sized gap is also formed between the opening 118 formed on the leg section 112 of the module cover 110 and the hook 116. As a result, the module cover 110 can be moved vertically when viewing FIG. 29. When the module cover 110 is pressed, a horn switch (not shown) is pressed so as to be turned on. The horn switch is integrally formed with the retainer 102 and attached to an extending portion extending from the retainer 102.

In case that a horn switch is attached to the extending portion formed integrally with a retainer as in the airbag apparatus shown in FIG. 29, when the shape of module cover and the position of horn switch differ in each airbag apparatus, the retainer is required to be designed corresponding to the module cover shape and the horn switch position of each airbag apparatus, adding significant cost and inconvenience to the manufacturing and design processes.

SUMMARY OF THE INVENTION

It is an object of the present invention to provide an airbag apparatus capable of having a retainer in common to various models of an airbag apparatus which include a horn switch that is turned on by moving a module cover back and forth.

An airbag apparatus according to the present invention comprises: an airbag; a retainer having the airbag attached thereto; a module cover covering the airbag and being movable and extending toward the retainer; a horn-switch supporting member which is a separate part from the retainer; and a horn switch which is supported by the horn-switch supporting member and which is turned on by the approaching movement of the module cover toward the retainer.

In such an airbag apparatus, even if the position of the horn switch differs in each airbag apparatus, the common retainer can be used by changing only the horn-switch supporting member.

In addition, it is preferable that an engagement portion or lower engagement mechanism for positioning the horn-switch supporting member relative to the retainer be provided so that the degree of accuracy of mounting the horn-switch supporting member be improved and efficiency of the mounting work be increased.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Although references are made below to directions, such as left, right, up, down, etc., in describing the drawings, they are made relative to the drawings (as normally viewed) for convenience. These directions are not intended to be taken literally or limit the present invention in any form.

Figure 1:
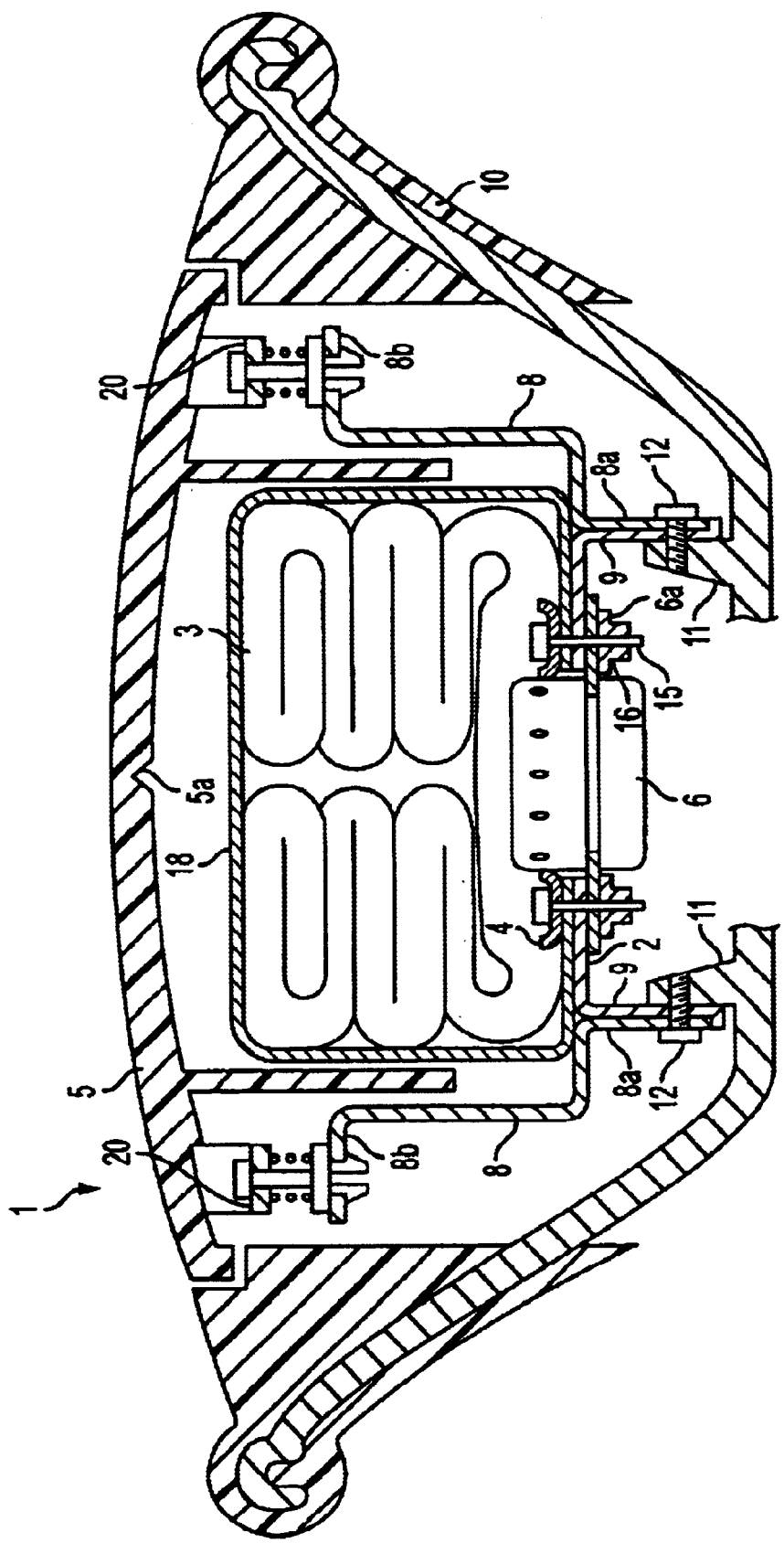
FIG. 1 is a sectional view of an airbag apparatus according to an embodiment of the present invention.
Figure 2:
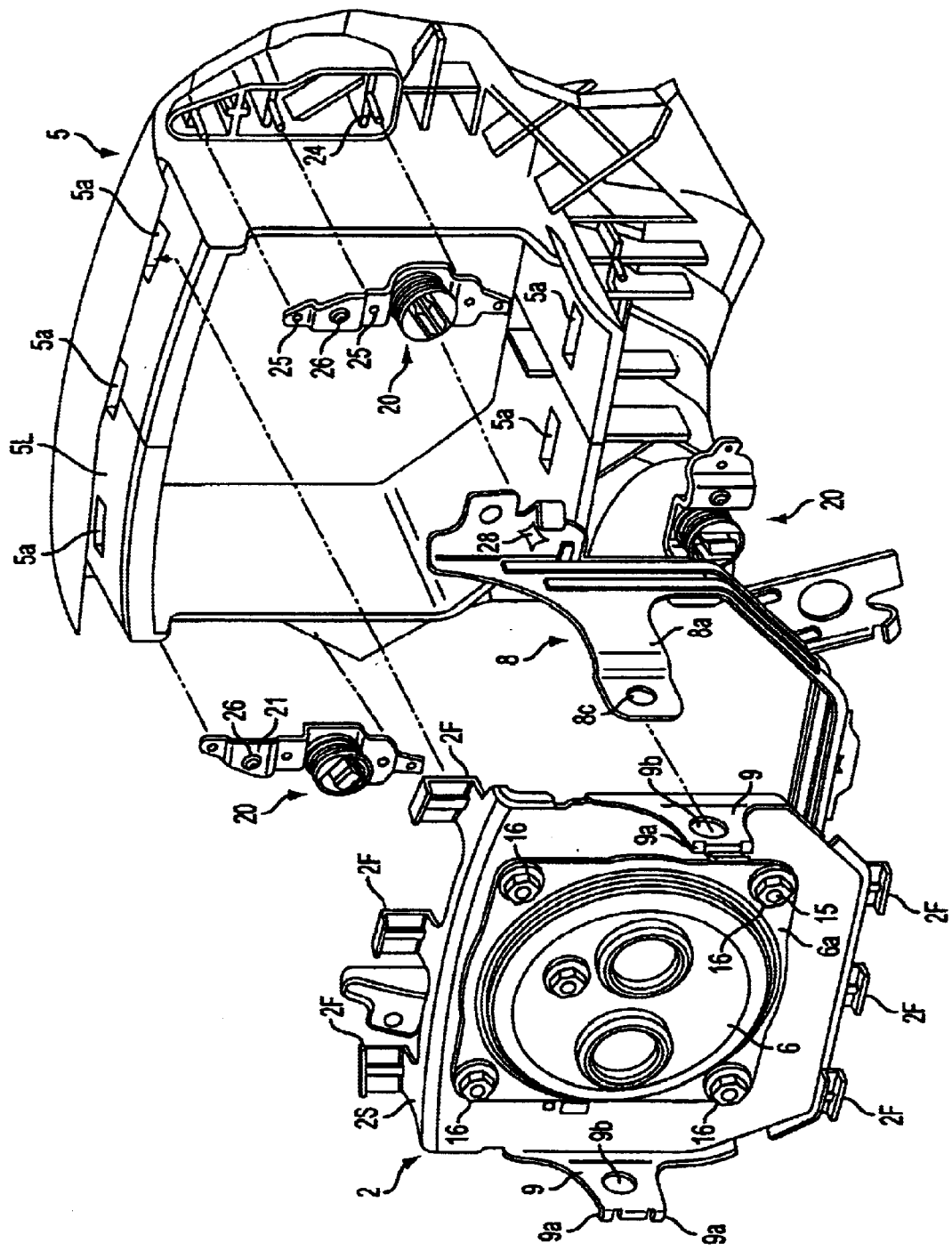
FIG. 2 is an assembly view of the airbag apparatus according to the embodiment at FIG. 1.
Figure 3:
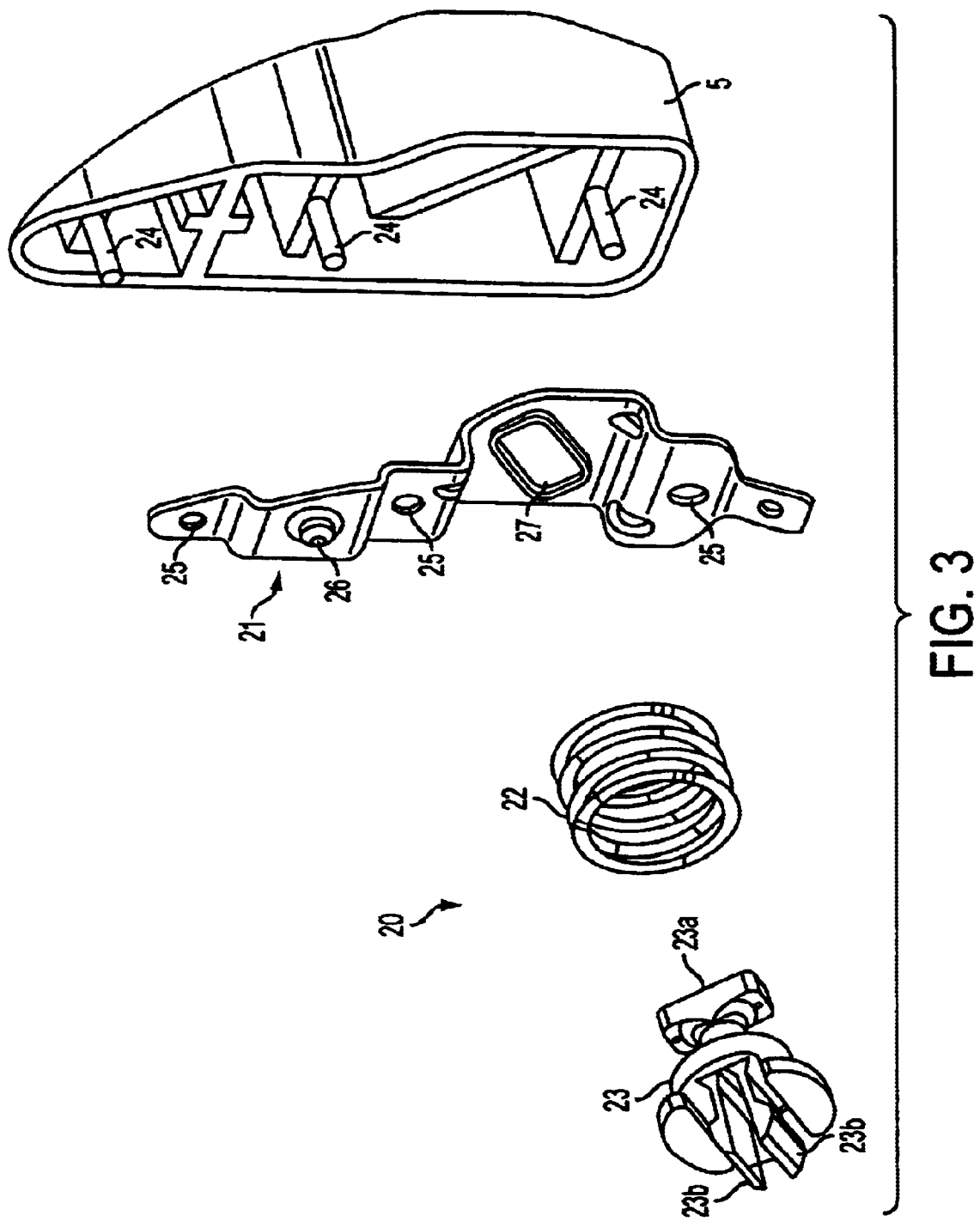
FIG. 3 is an assembly view of a horn switch.

Exemplary embodiments of the invention will be described below with reference to the drawings. FIG. 1 is a sectional view of an airbag apparatus according to an embodiment; FIG. 2 is an assembly view of the airbag apparatus (an air bag is not shown for illustrating clearly); FIG. 3 is an assembly view of a horn switch; and FIG. 4 is a sectional view of the horn switch.

An airbag apparatus 1 comprises a retainer 2, an airbag 3 attached to the retainer 2 with an airbag fitting ring 4, an inflator 6 for inflating the airbag 3, and a module cover 5 for covering the folded airbag 3. The shape of the folded airbag 3 is maintained by a shape holding member 18.

As shown in FIG. 2, a leg section 5L integrally protrudes from the back side of the module cover 5, and hooks 2F of a side-wall section 2S, which is bent forward from the retainer 2, are inserted through openings 5a in the leg section 5L. The hook 2F protrudes outward from the side-wall section 2S in an L-shape.

The inflator 6 has a flange 6a, and bolts 15 protruding from the ring 4 are inserted through the retainer 2 and the flange 6a, so that the inflator 6 is fixed to the retainer 2 together with the airbag 3 by tightening nuts 16.

From a steering wheel 10, a bracket 11 protrudes upward when viewing FIG. 1, and base portions 8a of a horn-switch supporting member 8 and projecting pieces 9 protruding downward from the back side of the retainer 2 are fixed to the bracket 11 with bolts 12. In the base portion 8a and the projecting piece 9, openings 8c and 9b to be inserted by the bolt 12 are respectively formed. The bolt 12 is screwed into a tapped hole formed on the bracket 11. At the tip of the projecting piece 9, a lug 9a for receiving and positioning the base portion 8a is formed by bending.

A horn switch 20 lies between an upper portion 8b of the horn-switch supporting member 8 and the module cover 5. The upper portion 8b extends in the direction orthogonal to the back-and-forth-moving direction of the module cover 5.

Between the shape holding member 18 and the module cover 5, a predetermined gap is formed. A predetermined gap is also formed between the opening 5a formed on the leg section 5L of the module cover 5 and the hook 2F. As a result, the module cover 5 can be vertically moved when viewing FIG. 1. When the module cover 5 is pressed, the horn switch 20 is pressed so as to be turned on.

As shown in FIGS. 3 and 4, the horn switch 20 preferably comprises a contact member 21, a coil spring 22, and a spring guide 23 fitted inside the spring 22.

A hole 25 is formed in the contact member 21. A projecting pin 24 which protrudes from the module cover 5 may be deposited in the hole 25. The contact member 21 is fixed to the module cover 5 by depositing the tip of the projecting pin 24 after the projecting pin 24 is inserted into the hole 25.

In the contact member 21, a contact 26 formed of a projection and an opening 27 for retaining a head portion 23a of the guide 23 are formed. When the module cover 5 is pressed, the contact 26 abuts the upper portion 8b of the horn-switch supporting member 8, so that the horn switch 20 is turned on so as to sound a horn.

Figure 4A:
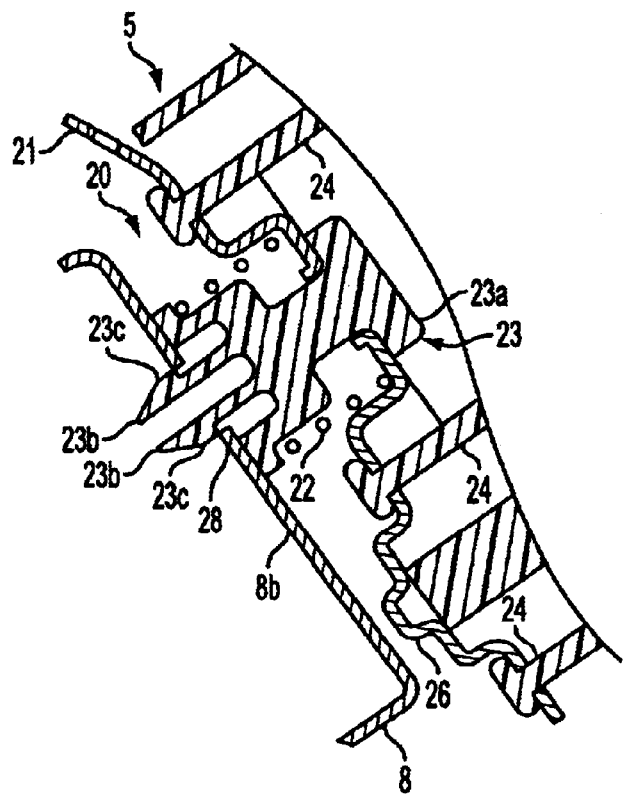
FIGS. 4(a) and 4(b) are sectional views of the horn switch.

As shown in FIG. 4(a), the spring guide 23 is retained in the opening 27 at the head portion 23a while a pair of elastic legs 23b in the base side thereof are retained in an opening 28 on the upper portion 8b of the horn-switch supporting member 8. The legs 23b are elastically deformable in directions approaching to and separating from each other. Projections 23c are formed on the opposite faces to the opposing faces of the legs 23b, and the projections 23c are retained by the upper portion 8b surrounding the opening 28.

The spring guide 23 may function as an insulator between the supporting member 8 and the contact member 21. Furthermore, the guide 23 is configured to properly align the contact member 21 and supporting member 8 with the module cover 5, thereby ensuring proper operation of the switch. Due to the multiple functions of the guide 23 the switch may be configured with fewer parts resulting in a vast improvement over the prior art.

Figure 4B:
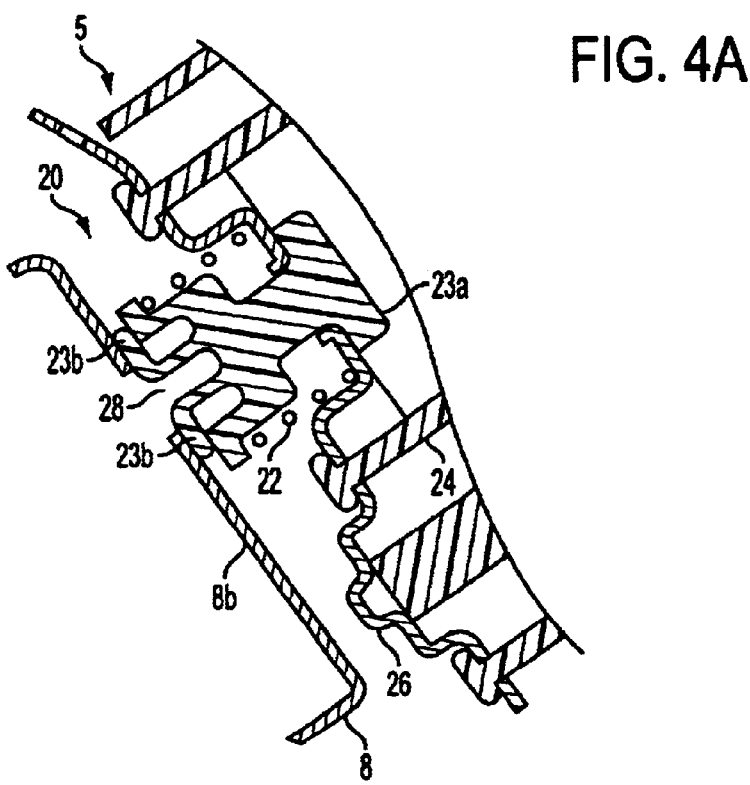

When the airbag 3 is inflated so that the module cover 5 is torn and opened along a tearing line 5a, a great force is applied to the horn switch 20 from the module cover 5 in the direction separating from the supporting member 8. At this time, the legs 23b come out of the opening 28. Then, when the module cover 5 abuts an occupant, as shown in FIG. 4(b), the pair of legs 23b are deformed astride along the top face of the upper portion 8b of the supporting member 8 so as to maintain the gap between the contact 26 and the horn-switch supporting member 8, thereby preventing the horn switch 20 from being turned on.

In the airbag apparatus according to the present invention, the horn-switch supporting member 8 is a separated part from the retainer 2. Thus, the retainer 2 can be common to various models of the airbag apparatus having the module cover 5 different in size and shape by changing only the horn-switch supporting member 8.

Figure 5:
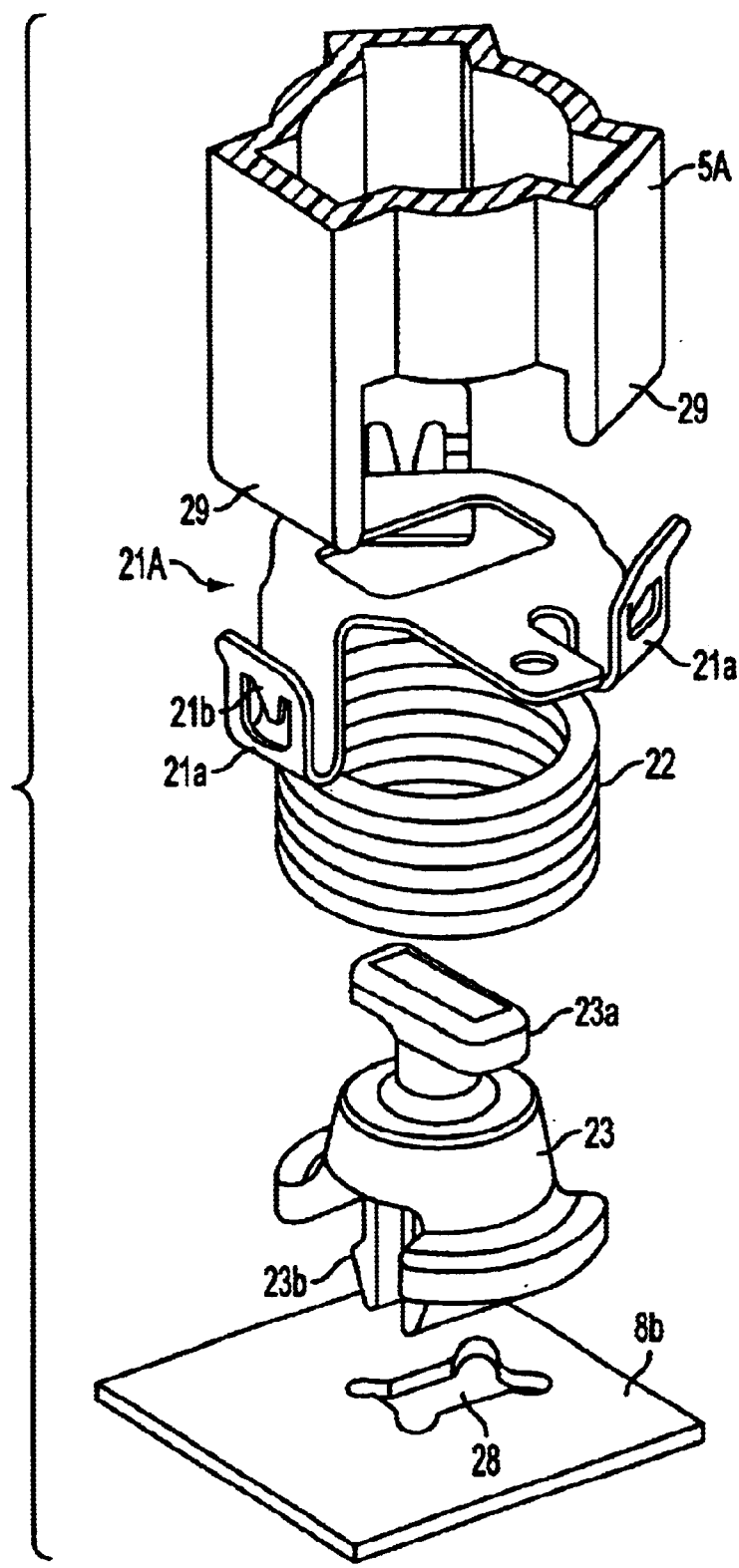
FIG. 5 is an assembly view of a horn switch.

FIG. 5 is a perspective view of another horn switch according to the present invention. In the horn switch 20A, U-shaped brackets 21a are formed in a contact member 21A and are retained to vertical wall portions 29 formed in a module cover 5A. In the bracket 21a, a hook 21b is formed, and the contact member 21A is fixed to the module cover 5A by engaging the hook 21b into the vertical wall portion 29. The other structures of the horn switch shown in FIG. 5 are the same as those shown in FIG. 3. Throughout the application, like reference numerals designate like structures.

Figure 6:
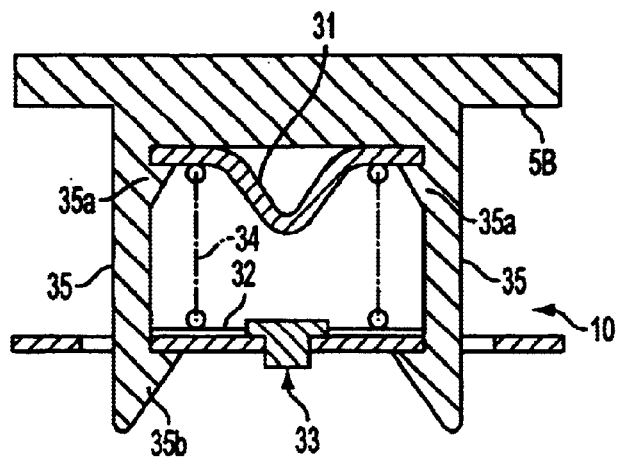
FIG. 6 is a sectional view of a horn switch.
Figure 7:
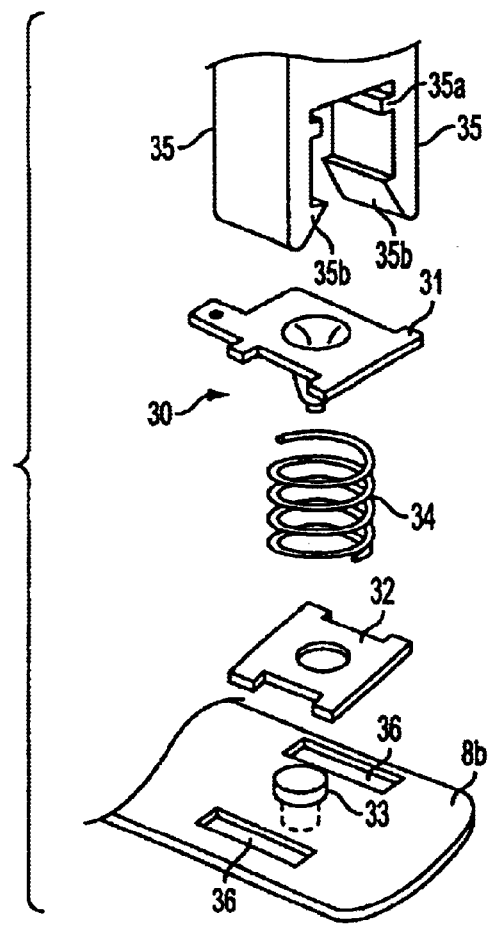
FIG. 7 is an assembly view of the horn switch.

FIG. 6 is a sectional view of another embodiment of a horn switch according to the present invention, and FIG. 7 is an assembly view thereof. The horn switch 30 comprises a switch plate 31 held by a module cover 5B, an insulating plate 32 attached to the upper portion 8b of the horn-switch supporting member 8 so as to oppose the switch plate 31, a fixed contact 33 fixed to the horn-switch supporting member 8 so as to penetrate through the insulating plate 32, a spring 34, and a pair of projecting pieces 35 united with the module cover 5B.

The switch plate 31 is held by convex portions 35a protruding from base sides of the projecting pieces 35, as shown in FIG. 6. The spring 34 lies between the insulating plate 32 and the switch plate 31. Hooks 35b formed at tips of the projecting pieces 35 are retained in openings 36 formed on the horn-switch supporting member 8. When the module cover 5B is pressed, the tip of the switch plate 31 abuts the contact 33, so that the horn switch 30 is turned on so as to sound a horn.

Figure 8:
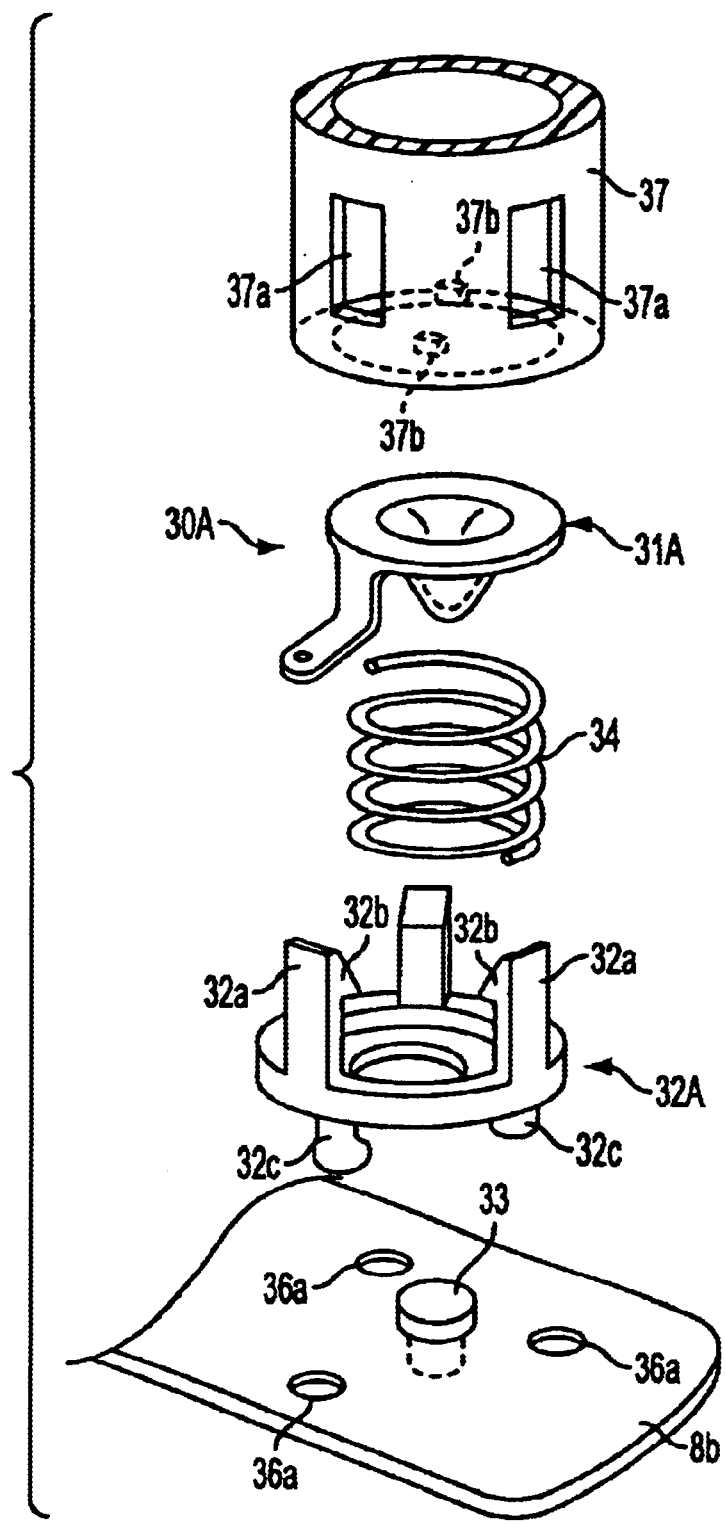
FIG. 8 is an assembly view of a horn switch.

FIG. 8 is an assembly view showing a structural example of still another embodiment of a horn switch according to the present invention. The horn switch 30A comprises a switch plate 31A, the spring 34, an insulating plate 32A, and the contact 33. The switch plate 31A is fitted inside a cylindrical body 37 formed in the module cover as far as the switch plate 31A abuts stoppers 37b. In the insulating plate 32A, plural extending pieces 32a (three pieces in this case) are formed. Convex portions 32b of the extending pieces 32a are brought into engagement with elongated holes 37a of the cylindrical body 37. The insulating plate 32A is fixed to the upper portion 8b of the horn-switch supporting member 8 by engaging convex portions 32c formed on the base of the insulating plate 32A with openings 36a of the upper portion 8b. When the module cover is pressed, a convex portion of the switch plate 31A abuts the contact 33, so that the horn switch 30A is turned on.

Figure 9:
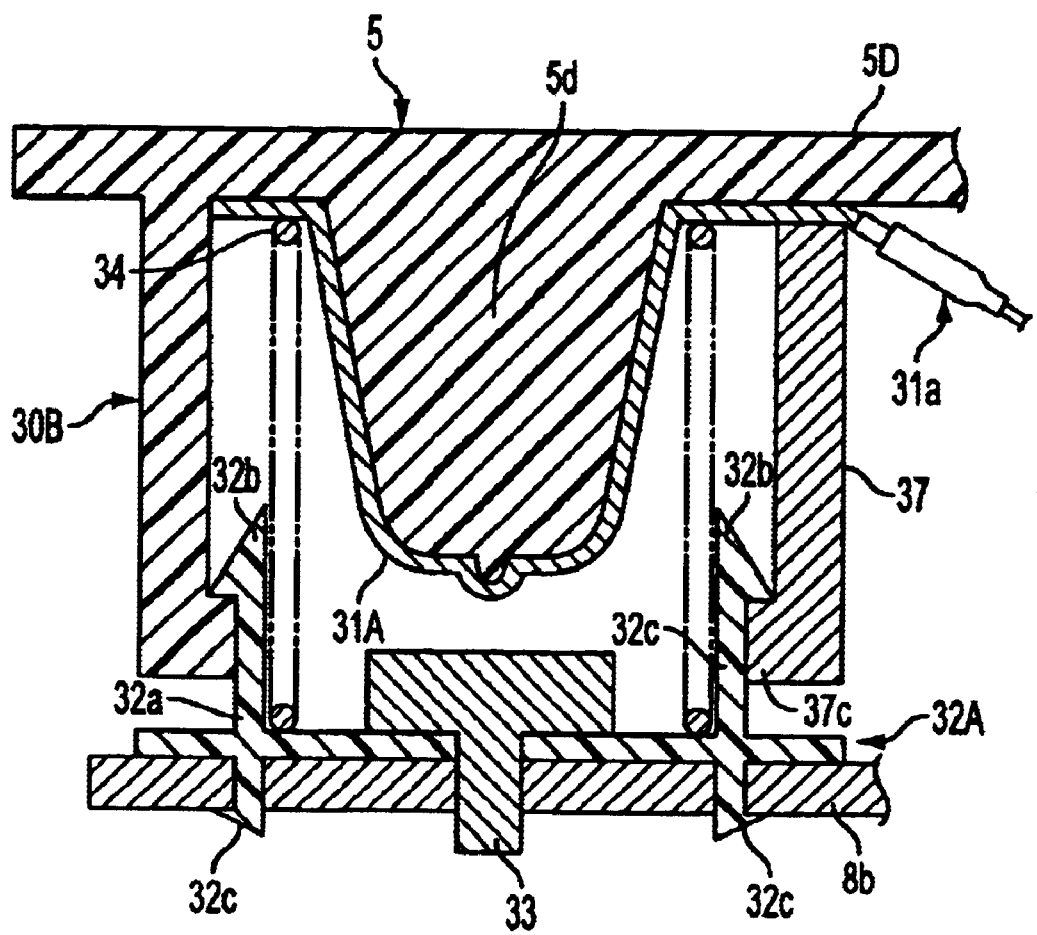
FIG. 9 is a sectional view of a horn switch.

The extending pieces 32a are arranged in the external periphery of the cylindrical body 37, as shown in FIG. 8. Alternately, as shown in FIG. 9, an insulating plate 32A' of a horn switch 30B may be provided that provides for the extending pieces 32a to be arranged along the internal periphery of the cylindrical body 37. The convex portions 32b are brought into engagement with a circumferential projection 37c in the internal periphery at the lower end of the cylindrical body 37. The switch plate 31A is fitted around a projecting portion 5d of a module cover 5D. A connector 31a may be provided to link the switch plate 31A to external circuitry and equipment including, for example, the vehicle horn. The other reference characters shown in FIG. 9 designate like common portions shown in FIG. 8.

Figure 10:
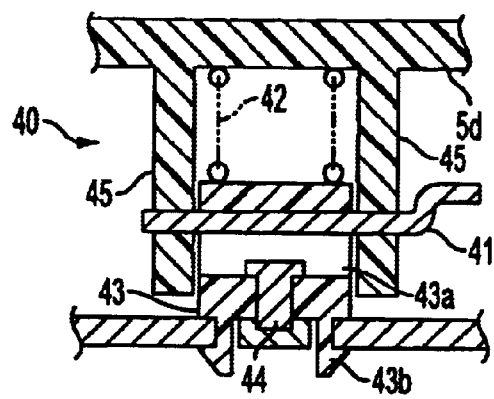
FIG. 10 is a sectional view of a horn switch.
Figure 11:
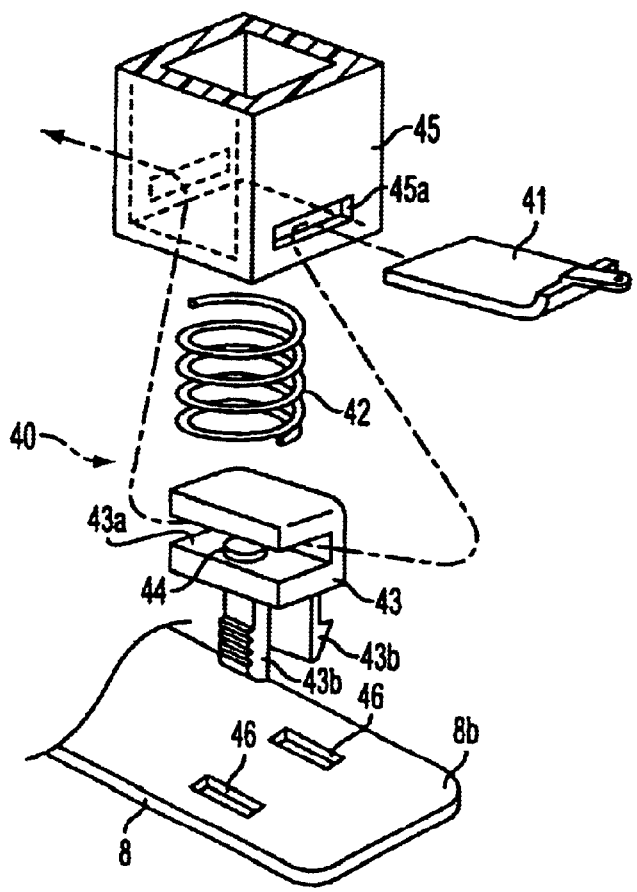
FIG. 11 is an assembly view of the horn switch.

FIGS. 10 and 11 are sectional and assembly views respectively for showing a structural example of a further horn switch according to another alternative embodiment of the present invention.

The horn switch 40 comprises a switch plate 41 held by a module cover 5C, a spring 42, an insulating block 43, and a contact 44 disposed in the insulating block 43. From the module cover 5C, a square portion 45 protrudes, so that the switch plate 41 is inserted through slots 45a formed on a pair of opposing faces of the square tubular portion 45. In addition, the insulating block 43 is ⊃-shaped (or C-shaped) when viewing the side thereof, and into a space 43a equivalent to the intermediate of the ⊃-shaped portion, the switch plate 41 is inserted. A spring 42 lies between the top face of the insulating block 43 and the module cover 5C.

A pair of leg pieces 43b protruding from the bottom face of the insulating block 43 are brought into engagement with openings 46 on the upper portion 8b of the horn-switch supporting member 8. When the module cover SC is pressed, the switch plate 41 abuts the contact 44, so that the horn switch 40 is turned on.

Figure 12:
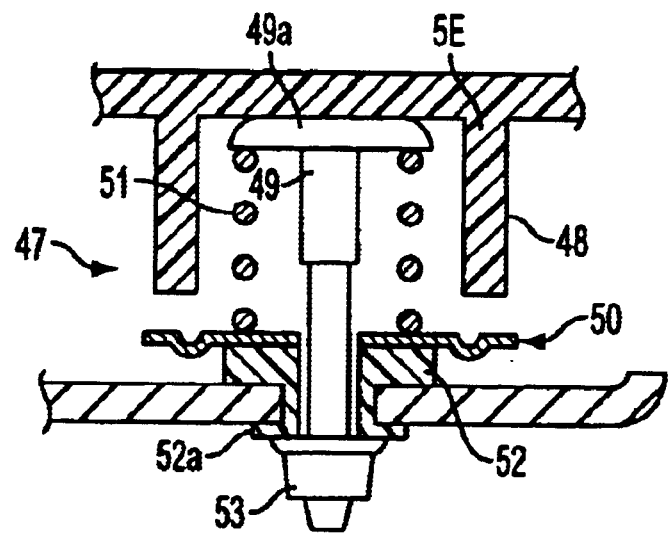
FIG. 12 is a sectional view of a horn switch.

A horn switch 47 shown in FIG. 12 comprises a guide shaft 49 arranged inside a cylindrical portion 48 disposed in a module cover 5E. A spring 51 lies between a cap 49a at the head of the guide shaft 49 and a switch plate 50. An insulating body 52 lies between the switch plate 50 and the horn-switch supporting member 8.

The guide shaft 49 penetrates through the insulating body 52 and the switch plate 50. At the lower end of the guide shaft 49, a stopper nut 53 is fixed, and the stopper nut 53 abuts a lower flange 52a of the insulating body 52. The external peripheral portion of the switch plate 50 extends outwardly off the insulating body 52, and is elastically deformable.

When the module cover 5E is pressed, the cylindrical portion 48 lowers the external periphery of the switch plate 50 forcing it to contact the horn-switch supporting member 8, and the horn switch 47 is thereby closed or turned on.

Figure 13:
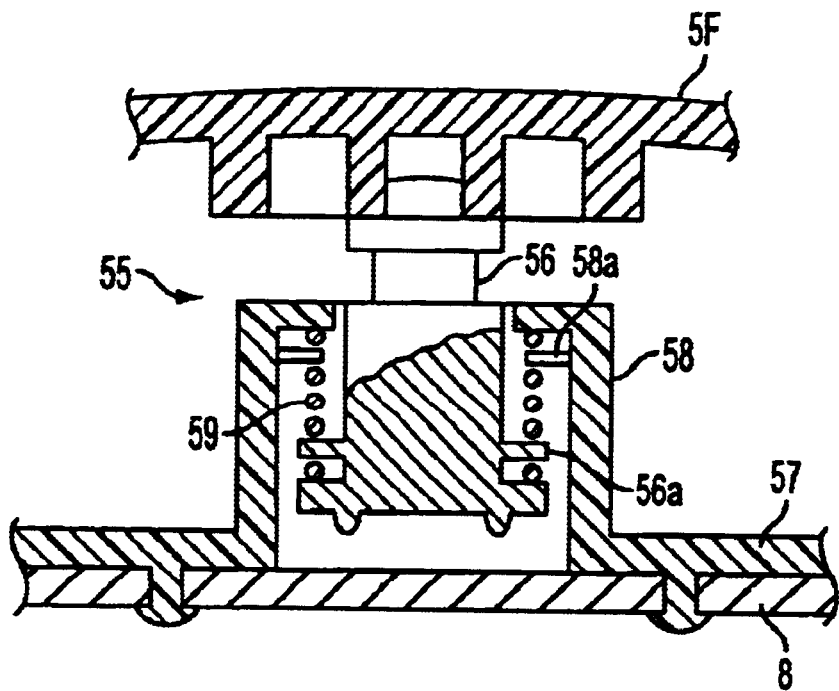
FIG. 13 is a sectional view of a horn switch.

In a horn switch 55 shown in FIG. 13, the upper end of a metallic guide shaft 56 serves as a contact member and is fixed to a module cover 5F. On the horn-switch supporting member 8, an insulating plate 57 is attached. A cylindrical portion 58 protrudes from the insulating plate 57. Inside the cylindrical portion 58, the horn-switch supporting member 8 is exposed. Between a projection 58a on the internal peripheral face of the cylindrical portion 58 and a projection 56a on the internal peripheral face of a lower portion of the guide shaft 56, a tension coil spring 59 is hung. When the module cover 5F is pressed, the coil spring 59 is stretched so that the guide shaft 56 abuts the horn-switch supporting member 8, and the horn switch 55 is thereby turned on.

Figure 14:
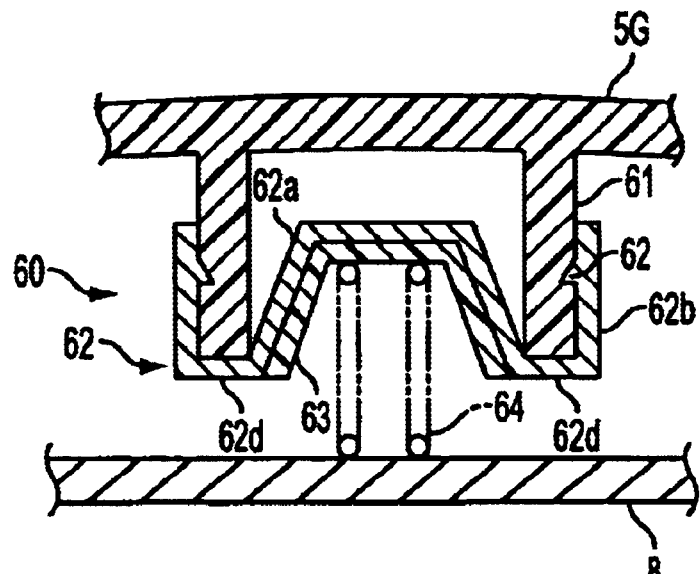
FIG. 14 is a sectional view of a horn switch.

A horn switch 60 shown in FIG. 14 comprises a switch plate 62 fitted into a cylindrical portion 61 protruding from a module cover 5G. The switch plate 62 comprises a truncated conical portion 62a inserted into the cylindrical portion 61, an external annular portion 62b arranged along the external peripheral face of the cylindrical portion 61, and hooks 62c disposed in the external annular portion 62b. The switch plate 62 is fixed to the cylindrical portion 61 by engaging the hooks 62c into the external peripheral face of the cylindrical portion 61. A truncated conical insulating cap 63 is fitted into the truncated conical portion 62a of the switch plate 62. A spring 64 lies between the cap 63 and the horn-switch supporting member 8.

When the module cover 5G is pressed, the horn-switch supporting member 8 abuts a contact portion 62d of the switch plate 62, and the horn switch 60 is thereby turned on.

Figure 15:
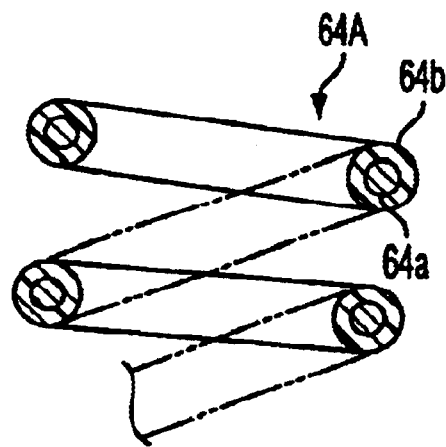
FIG. 15 is a sectional view of a spring for a horn switch.

The insulating cap 63 is used in the horn switch shown in FIG. 14. However, the insulating cap 63 may be omitted as long as a spring 64A having an insulating film 64b formed on the surface of a spring body 64a is used, as shown in FIG. 15.

Figure 16A:
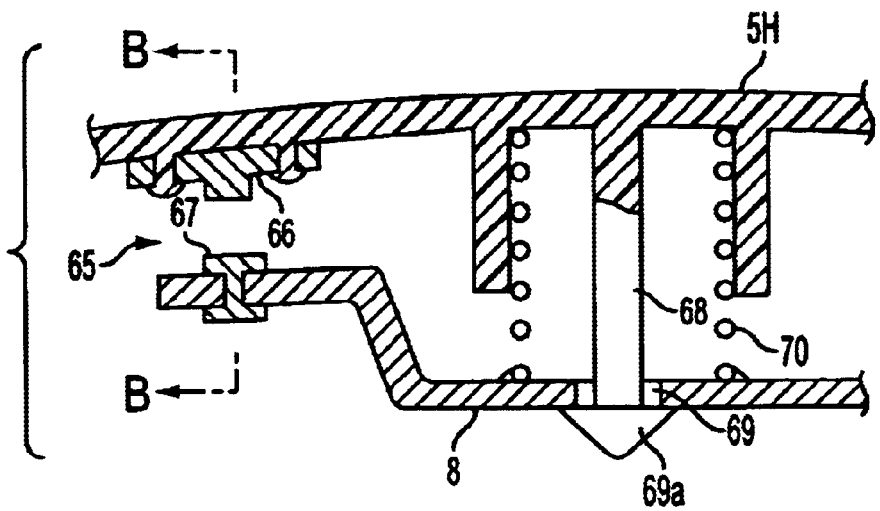
FIGS. 16(a) and 16(b) are sectional views of an airbag apparatus in the vicinity of a horn switch.
Figure 16B:
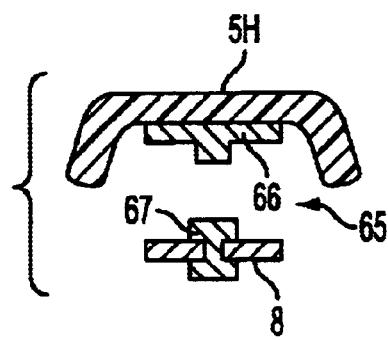

A horn switch 65 shown in FIG. 16 comprises a switch plate 66 attached to a module cover 5H and a contact 67 disposed in the horn-switch supporting member 8. On the module cover 5H, a guide shaft 68 is projectingly formed in the vicinity of the horn switch 65. An enlarged conical head 69a at the lower end of the guide shaft 68 is brought into engagement with a lower fringe of an opening 69 on the horn-switch supporting member 8. A coil spring 70 lies so as to surround the guide shaft 68 between the module cover 5H and the horn-switch supporting member 8. The spring 70 is welded to the horn-switch supporting member 8. When the module cover 5H is pressed, the switch plate 66 abuts the contact 67, and the horn switch 65 is thereby turned on. FIG. 16(b) is a sectional view at the line B—B of FIG. 16(a).

Figure 17A:
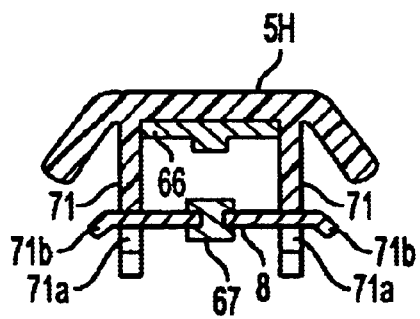
FIGS. 17(a) and 17(b) are sectional views of an airbag apparatus in the vicinity of a horn switch.
Figure 17B:
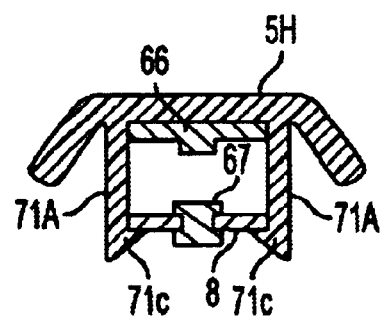

As shown in FIGS. 17(a) and 17(b), module cover 5H may include guide plates 71 or guide plates 71A projectingly formed on both sides of the switch plate 66. In FIG. 17(a), the guide plate 71 comprises an opening 71a, and projecting tongue-like portions 71b on both sides of the horn-switch supporting member 8 are brought into engagement with the openings 71a. In FIG. 17(b), hooks 71c formed at the lower ends of the guide plates 71A are brought into engagement with both sides of the horn-switch supporting member 8. FIGS. 17(a) and (b) shows the same sections as those shown in FIG. 16(b).

Regarding the aforementioned examples of horn switches, welding may be used to connect the vertical wall portions of the module cover to a portion of the contact member.

Referring to FIGS. 18 to 22, different engaging examples between the retainer 2 and the horn-switch supporting member 8 (i.e., a lower engagement mechanism) will be described.

Figure 18:
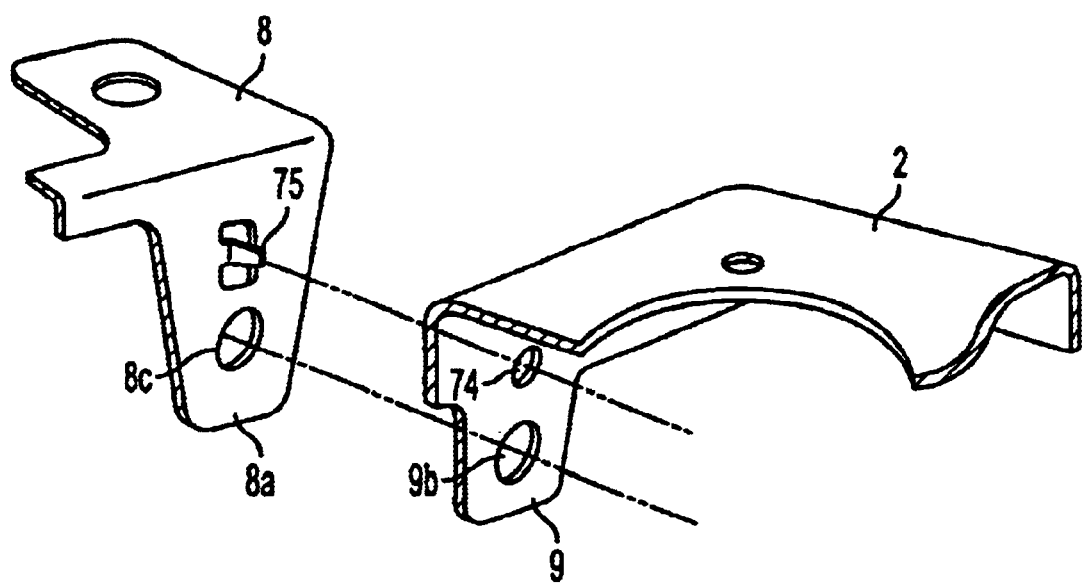
FIG. 18 is an assembly view for showing an engaging relationship between a horn-switch supporting member and a retainer.

In FIG. 18, a projection 75 is formed in a base portion 8a of the horn-switch supporting member 8 and is brought into engagement with an opening 74 on the projecting piece 9 of the retainer 2, thereby positioning the horn-switch supporting member 8.

Figure 19A:
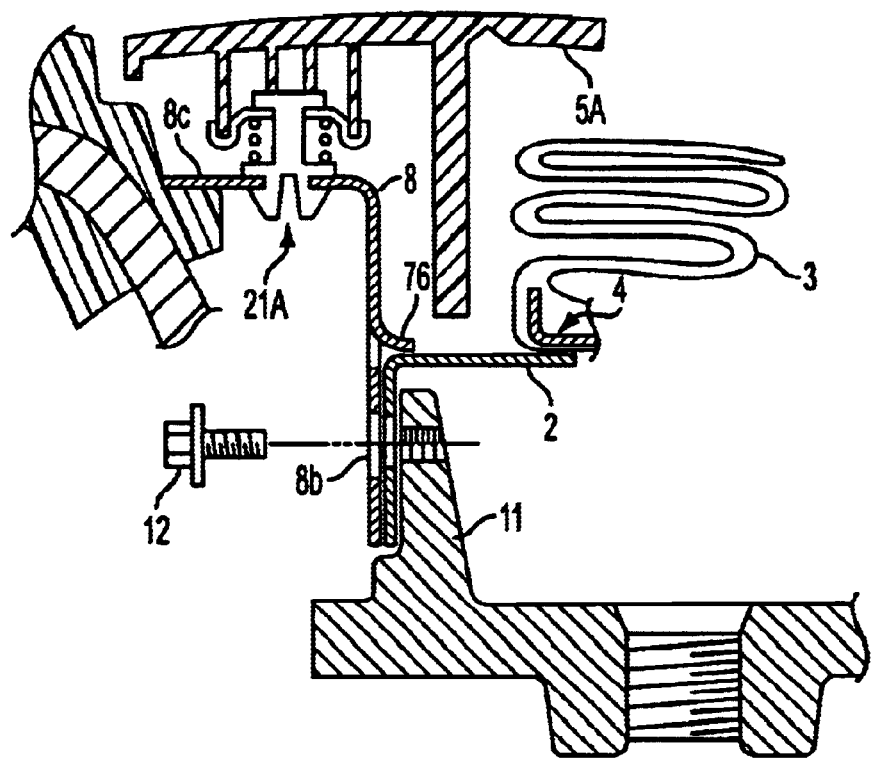
FIGS. 19(a) and 19(b) are a sectional view and an assembly view showing an engaging relationship between the horn-switch supporting member and the retainer.
Figure 19B:
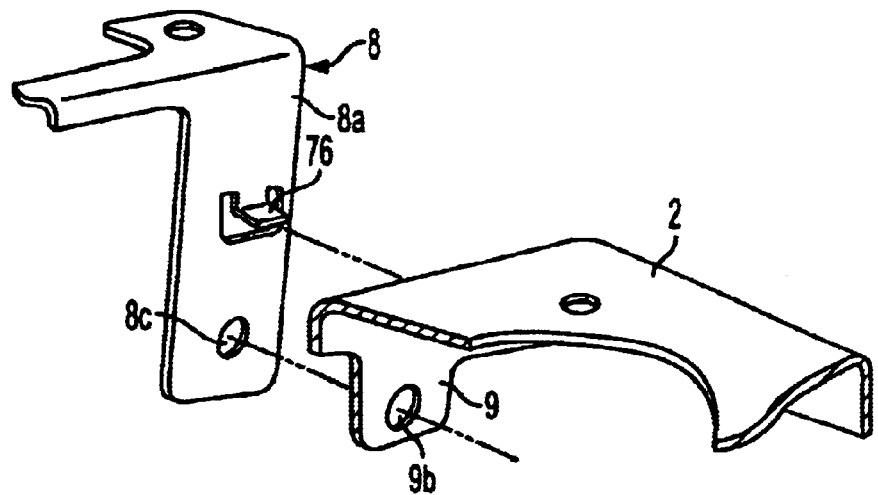

In FIGS. 19(a), (b), the opening 74 is omitted and the horn-switch supporting member 8 is positioned by retaining a projection 76 in the base portion 8a to a corner of the upper fringe of the retainer 2. Although, the horn switch 21A is shown in FIG. 19, any one of the horn switches mentioned above may be used. FIG. 19(b) is an assembly view showing the engaging relationship between the horn switch and the retainer. FIG. 19(a) is a sectional view of an essential part of the airbag apparatus having the structure shown in FIG. 19(b).

Figure 20:
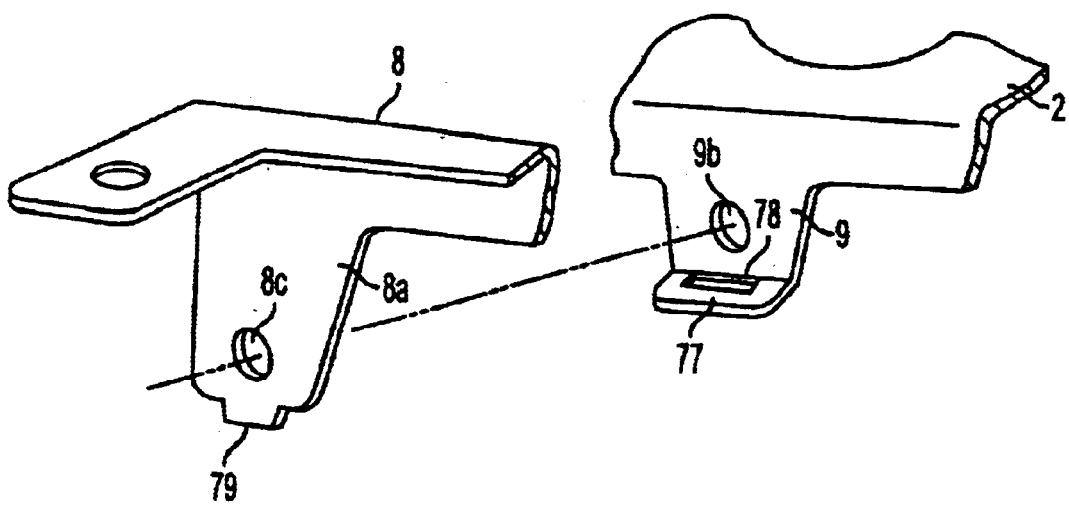
FIG. 20 is an assembly view for showing an engaging relationship between the horn-switch supporting member and the retainer.

As shown in FIG. 20, a rising piece 77 may be formed at the lower end of the projecting piece 9 of the retainer 2. A slit or slot 78 may be formed at the root of the rising piece 77. A projection 79 formed at the tip of the base portion 8a in the horn-switch supporting member 8 is brought into engagement with the slit 78, thereby positioning the horn-switch supporting member 8.

Figure 21:
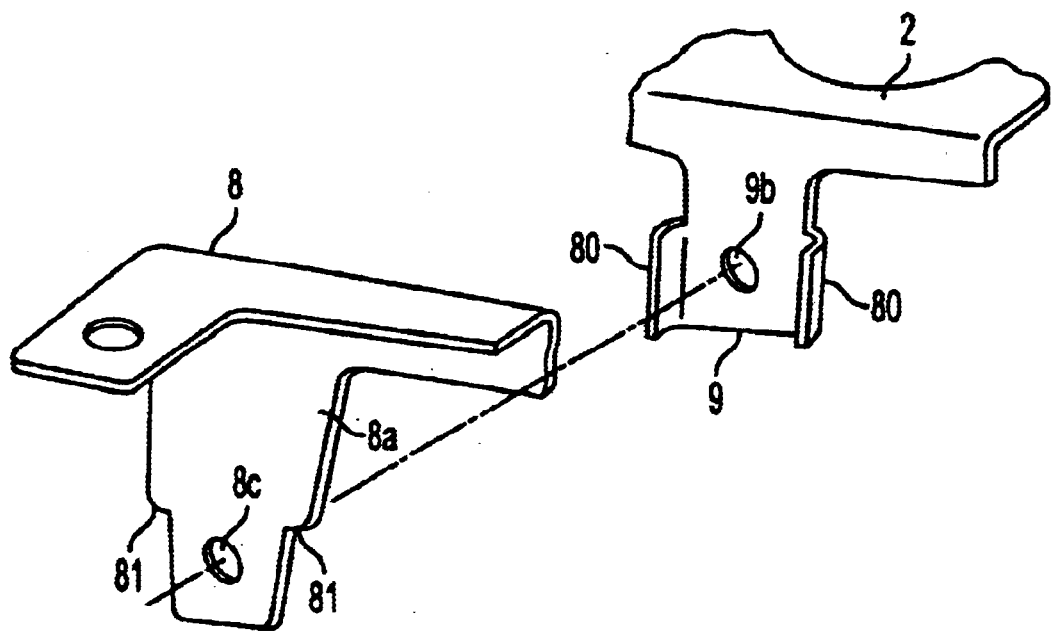
FIG. 21 is an assembly view for showing an engaging relationship between the horn-switch supporting member and the retainer.

As shown in FIG. 21, ribs 80 may be erected along the both sides of the projection piece 9, and steps 81 formed in both sides of the base portion 8a may be abutted to the upper ends of the ribs 80, so that the horn-switch supporting member 8 is positioned.

Figure 22:
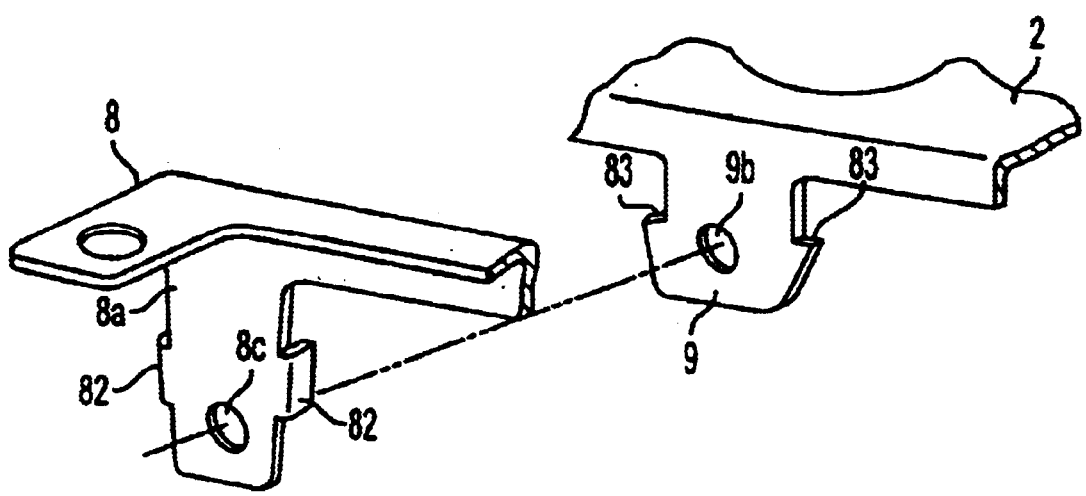
FIG. 22 is an assembly view for showing an engaging relationship between the horn-switch supporting member and the retainer.

As shown in FIG. 22, ribs 82 may be erected along the both sides of the base portion 8a, and steps 83 formed in both sides of the projection piece 9 may be abutted to the ribs 82, so that the horn-switch supporting member 8 is positioned.

In addition, as shown in FIG. 19(a), the tip of the upper portion 8b of the horn-switch supporting member 8 may be abutted to a step of the steering wheel 10, and the upper portion 8b of the horn-switch supporting member 8 is thereby positioned.

Referring to FIGS. 23 to 27, other positioning examples of the upper portion of the supporting member 8b relative to the steering wheel 10 (i.e., an upper engagement mechanism) will be described.

Figure 23:
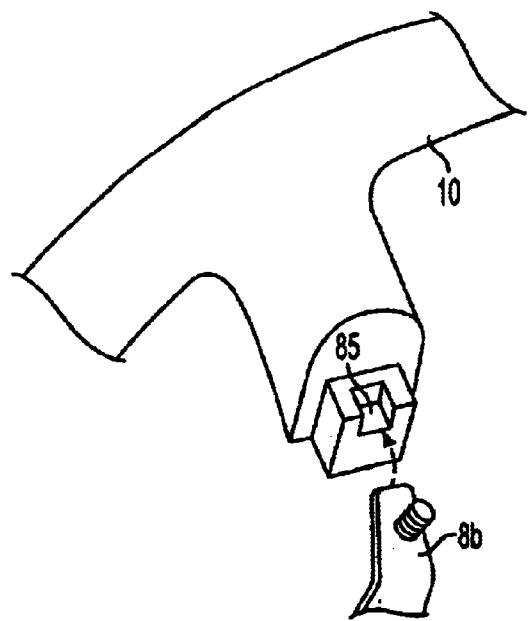
FIG. 23 is an assembly view for showing an engaging relationship between the horn-switch supporting member and a steering wheel.

In FIG. 23, a concave portion 85 is formed in the steering wheel 10, and the tip of the upper portion 8b of the horn-switch supporting member 8 is brought into engagement with the concave portion 85 so as to position the horn-switch supporting member 8.

Figure 24:
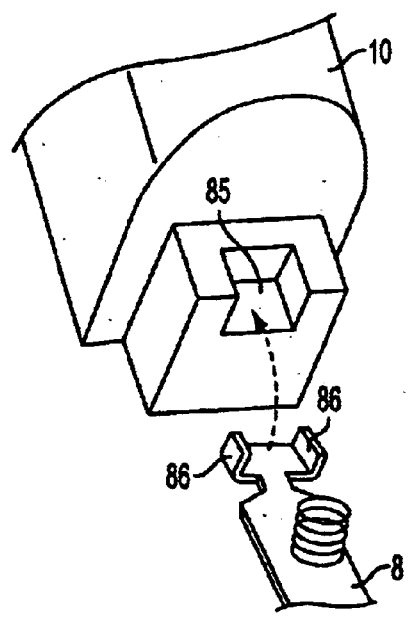
FIG. 24 is an assembly view for showing an engaging relationship between the horn-switch supporting member and the steering wheel.

In FIG. 24, ribs 86 are erected along the both sides of the end portion in the base portion 8a and abutted on vertical wall faces of the concave portion 85.

Figure 25:
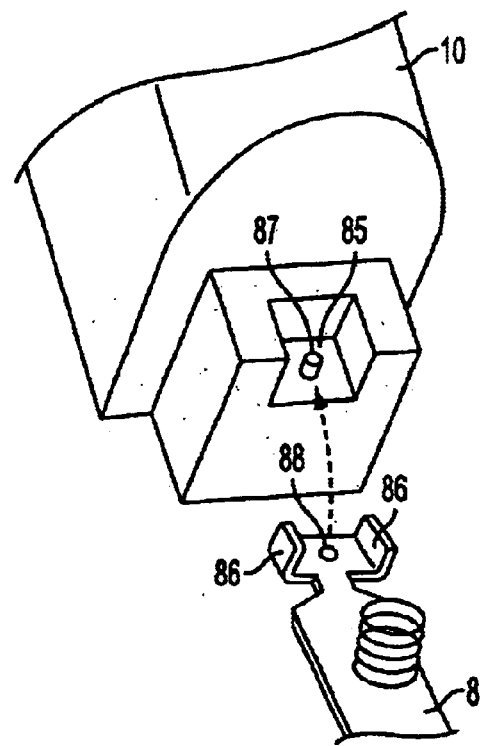
FIG. 25 is an assembly view for showing an engaging relationship between the horn-switch supporting member and the steering wheel.
Figure 26A:
FIGS. 26(a)–26(e) are perspective views showing examples of the projection structure.
Figure 26B:
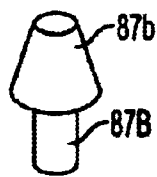
Figure 26C:
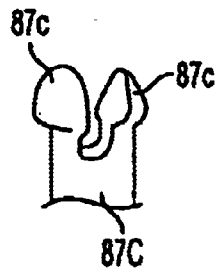
Figure 26D:
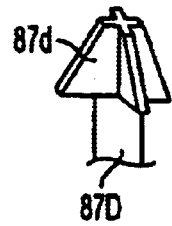
Figure 26E:
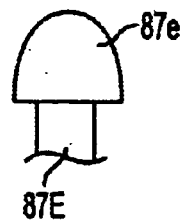

In FIG. 25, a projection 87 is formed on the bottom face of the concave portion 85 and fitted into a small hole 88 formed in the upper portion 8b of the horn-switch supporting member 8. In FIG. 25, the projection 87 is circular column-shaped; however, projections 87A to 87E having various shapes as shown in FIGS. 26(a) to 26(e) may be used. The projection 87A is tapered so as to engage with the small hole 88 tightly.

All the projections 87B, 87C, 87D, and 87E have enlarged portions 87b, 87c, 87d, and 87e at their end portions, respectively, and when each of the projections 87B to 87E is once fitted into the small hole 88, coming-off can be prevented due to the enlarged portions 87b to 87e.

Figure 27:
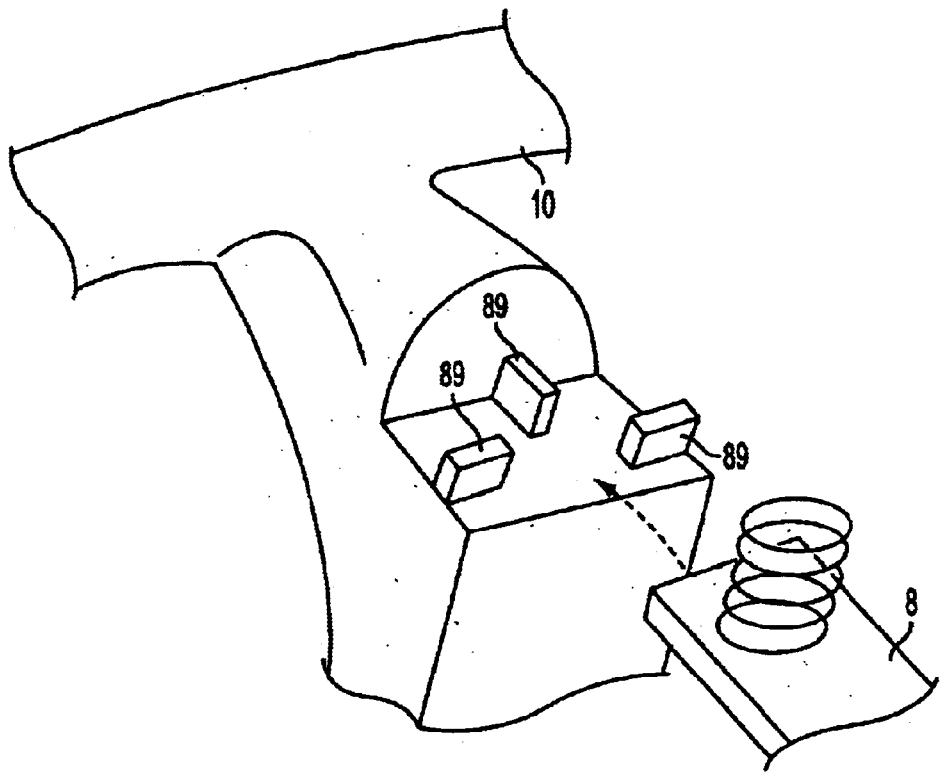
FIG. 27 is an assembly view for showing an engaging relationship between the horn-switch supporting member and the steering wheel.

In FIG. 27, the end of the horn-switch supporting member 8 is fitted into a space surrounded by three projection pieces 89.

Figure 28:
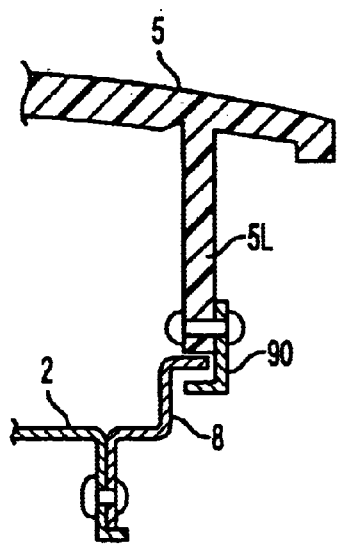
FIG. 28 is a sectional view for showing a different engaging relationship between a module cover and the retainer.
Figure 29:
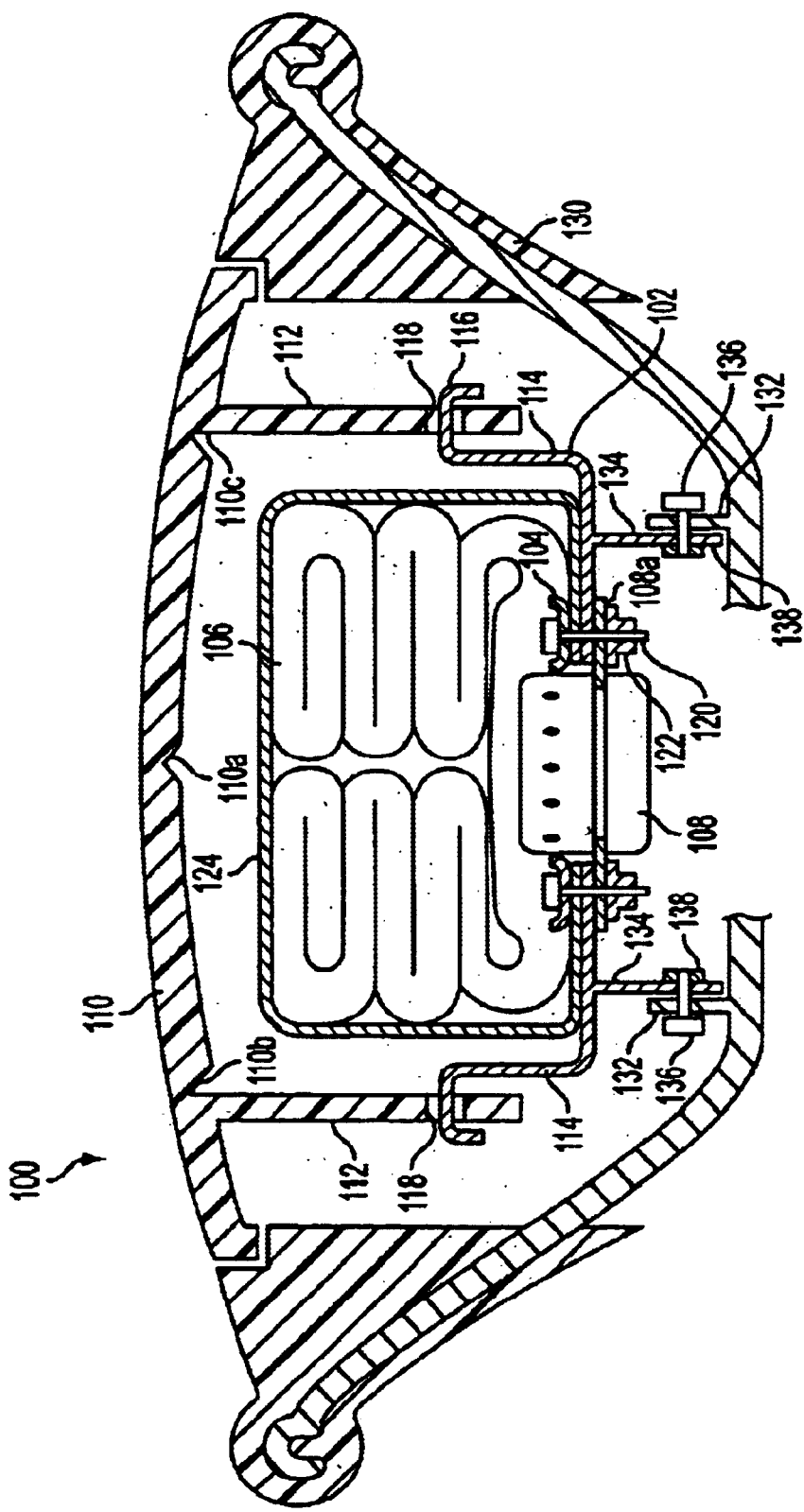
FIG. 29 is a sectional view of a module-cover-floating type airbag apparatus.

In the present invention, as shown in FIG. 28, an L-shaped hook fitting 90 may be attached to the leg section 5L of the module cover with a rivet, etc., so as to engage the hook fitting 90 with the end of the horn-switch supporting member 8.

As described above, in the airbag apparatus according to the present invention wherein only the module cover floats so as to turn the horn switch on, the retainer can be common to various models of the airbag apparatus. The horn-switch supporting member is sufficient to have a low strength, so that the weight of the apparatus can be reduced.

Given the disclosure of the present invention, one versed in the art would appreciate that there may be other embodiments and modifications within the scope and spirit of the invention. For example, in the embodiments described above, the coil spring is adopted for the horn switch; however, a leaf spring, etc., may be used.

Accordingly, all modifications attainable by one versed in the art from the present disclosure within the scope and spirit of the present invention are to be included as further embodiments of the present invention. The scope of the present invention is to be defined as set forth in the following claims.

We claim:

1. An airbag apparatus for a vehicle comprising:

a retainer member having an airbag attached thereto;

an electrical switch having a movable first contact and a stationary second contact;

a module cover covering said airbag and being positioned to move when directly contacted by a passenger of the vehicle, wherein the first contact is connected to the module cover so that the first contact moves toward a the second contact-when the cover is depressed; and wherein the second contact comprises a switch supporting member connected directly to the retainer.

2. The airbag apparatus of claim 1, further comprising a lower engagement mechanism for positioning the supporting member relative to the retainer.

3. The airbag apparatus of claim 2, wherein the supporting member and the retainer member are secured to a support bracket by a common fastener.

4. The airbag apparatus of claim 1, wherein the airbag apparatus is postioned in a steering wheel assembly including a steering wheel.

5. The airbag apparatus of claims 4, wherein the supporting member engages the steering wheel.

6. The airbag apparatus of claim 5, further comprising an upper engagement mechanism for positioning the supporting member relative to the steering wheel.

7. The airbag apparatus of claim 1, wherein the supporting member engages the module cover.

8. The airbag apparatus of claim 1, further comprising a spring position to bias the first contact away from the second contact.

9. An electrical switch assembly located within a steering wheel assembly for use with an electrical switch for a vehicle horn activation circuit, the switch assembly comprising:

an electrical contact mounted on a movable contact member connected to the steering wheel;

a switch supporting member connected to a stationary airbag retainer positioned so that when the contact member moves toward the supporting member; the electrical contact makes direct contact with the supporting member to thereby close the switch;

a spring positioned for biasing the electrical contact away from the supporting member; and a guide for maintaining the spring in position.

10. The switch assembly of claim 9, wherein the spring is positioned between the contact member and the supporting member.

11. The switch assembly of claim 9, wherein the contact member is connected to an airbag module cover.

12. The switch assembly of claim 9, wherein the guide is surrounded by the spring.

13. The switch assembly of claim 9, wherein the guide is secured to the supporting member.

14. The switch assembly of claim 13, wherein the guide is secured to the contact member and is configured to align the contact member relative to the steering wheel.

15. The switch assembly of claim 9, wherein the supporting member is attached to an air bag retainer.

16. The switch assembly of claim 9, further comprising an insulating member.

17. The switch assembly of claim 16, wherein the insulating member is positioned between the contact member and the supporting member.

18. The switch assembly of claim 9, wherein the guide is an insulating member.

* * * * *